United States Patent
Eggebrecht et al.

(10) Patent No.: US 6,652,218 B1
(45) Date of Patent: Nov. 25, 2003

(54) INDUCTOR STATION FOR SORTATION CONVEYING SYSTEM

(75) Inventors: Todd R. Eggebrecht, Mukwonago, WI (US); Jason M. Knas, Mukwonago, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 10/279,702

(22) Filed: Oct. 24, 2002

Related U.S. Application Data

(60) Division of application No. 09/759,769, filed on Jan. 12, 2001, now Pat. No. 6,517,308, which is a continuation-in-part of application No. 09/316,014, filed on May 24, 1999, now Pat. No. 6,182,815.

(51) Int. Cl.⁷ .......................... B65G 59/00; B65G 47/06
(52) U.S. Cl. ................ 414/798.9; 414/795.8; 198/468.1; 198/740
(58) Field of Search .................. 198/468.1, 740, 198/468.11, 443; 414/798.9, 795.8

(56) References Cited

U.S. PATENT DOCUMENTS

| | | |
|---|---|---|
| 1,427,825 A | 9/1922 | Klein |
| 2,011,839 A | 8/1935 | Anderson |
| 3,050,173 A | 8/1962 | Wimmer |
| 3,932,982 A | 1/1976 | Klapp |
| 3,952,635 A | 4/1976 | Mims |
| 4,037,734 A | 7/1977 | Erdman |
| 4,072,226 A | 2/1978 | Richards et al. |
| 4,219,112 A | 8/1980 | Loewenthal |
| 4,462,746 A | 7/1984 | Smets |
| 4,591,070 A | 5/1986 | Wirstlin |
| 5,230,206 A | 7/1993 | Christ |
| 5,454,688 A | 10/1995 | Pippin |
| 5,676,519 A | 10/1997 | Canziani et al. |
| 6,182,815 B1 | 2/2001 | Eggebrecht et al. |

FOREIGN PATENT DOCUMENTS

EP 0663356 A1 7/1995

OTHER PUBLICATIONS

Dorner SPS 200 Sequential Picking System Brochure, Dorner Mfg. Corp., 580 Industrial Drive, P.O. Box 20, Hartland, WI 53029–0020 (1 page).

Primary Examiner—Eileen D. Lillis
Assistant Examiner—Thuy V. Tran
(74) Attorney, Agent, or Firm—Andrus, Sceales, Starke & Sawall, LLP

(57) ABSTRACT

An inductor station for a sortation conveying system is able to accommodate an assortment of substantially rectangular items which in general each have unique dimensions. A worker loads the inductor station with a charge of items each standing upright on edge and side-by-side. The charges are loaded in sequence to a feeder tray, and a programmably controlled feeding assembly feeds the charges along the feeder tray to a loading mechanism. The loading mechanism loads the endmost item from a discharge end of the feeder tray onto a takeaway conveyor. The items are loaded on the takeaway standing upright and on edge. An indexing motion stripping conveyor is used to time the loading of the items onto the takeaway conveyor so that the items are conveyed to an appropriate pocket on the core conveyor for the sortation conveying system. The feeding assembly and the loading assembly are each programmably controlled to coordinate movement of items through the inductor station with each item substantially maintaining its upright orientation.

12 Claims, 15 Drawing Sheets

INDUCTOR STATION FOR SORTATION CONVEYING SYSTEM

This application is a divisional application of application Ser. No. 09/759,769 filed on Jan. 12, 2001, now U.S. Pat. No. 6,517,308, which is a continuation in part application of Ser. No. 09/316,014, filed May 24, 1999, now U.S. Pat. No. 6,182,815.

FIELD OF THE INVENTION

The invention relates to sortation conveying systems used to fulfill orders of assorted rectangular items such as books, packaged software, compact discs, games, video cassettes, etc. In particular, the invention relates to an inductor apparatus that loads items into assigned pockets on a core conveyor for the sortation system in single file with each item standing upright on edge in an essentially vertical orientation, thus facilitating efficient downstream processing and sorting.

BACKGROUND OF THE INVENTION

In centralized distribution applications, order fulfillment is often accomplished using computer controlled sortation conveying systems. Such systems can sometimes have lengths approaching 300 feet. Quite often, it is desirable that the sortation system be capable of fulfilling orders of intermingled items having assorted sizes. For example, it is not uncommon for an order to require a selected number of books having assorted sizes, intermingled with video cassette containers, compact disc containers, software, or the like.

In sortation conveying systems, a core conveyor conveys assorted items in single file, preferably in an upright position standing on edge so that bar code readers can easily identify the item prior to subsequent sorting and processing downstream. One type of core conveyor has separators or cleats dividing the conveyor belt into individual pockets. Sortation conveying systems normally include several inductor stations that are coordinated with the core conveyor to supply items to the pockets on the core conveyor in an organized manner. The items within the pockets on the core conveyor are then processed, sorted and stacked into separate outgoing orders. It is not unusual for outgoing orders to consist of hundreds of intermingled items, each generally having a rectangular shape but unique dimensions.

This invention relates to improvements to the operation of the inductor stations that load the items onto the core conveyor. It is desirable that workers be able to load assorted items into the inductor station in an easy and efficient manner, and that the inductor station be able to have items continually ready for loading onto the core conveyor under normal operating conditions. Preferably, the items should be standing upright on edge as the items are loaded onto the core conveyor. It is also desirable that the inductor stations be capable of efficiently handling assorted items having various dimensions.

SUMMARY OF THE INVENTION

The invention provides an inductor station that is able to accept charges of assorted items at an inconsistent or sporadic rate, yet is designed to continuously provide individual items ready for loading into assigned pockets in the core conveyor. In its preferred configuration, the inductor station accepts an assortment of substantially rectangular items each standing upright on edge and grouped in series side-by-side with other items. Each group of assorted items loaded into the inductor station is referred to as a charge. Each charge of assorted items is conveyed into a feeder tray for the inductor station in sequence one charge at a time, preferably using a gravity feed ramp with retractable queuing plates. A feeding assembly feeds the charge of assorted items along the feeder tray to a loading mechanism located at a discharge end of the feeder tray. The loading mechanism strips the endmost item from the charge, and loads the item onto a takeaway transporter with the item standing upright on edge. The loading mechanism is controlled in sync with the core conveyor to load the respective item into an assigned pocket on the core conveyor. Preferably, this is accomplished using a computer-controlled indexing motion stripping conveyor to load the items from the charge on the feeder tray in single file onto the takeaway transporter. In one embodiment of the invention, the takeaway transporter is a takeaway conveyor belt. In another embodiment of the invention, the takeaway transporter is a transport chute.

The invention is particularly efficient and reliable because each respective item is loaded into the inductor station standing upright on edge, and maintains an upright on edge orientation as it passes through the inductor station and into the assigned pocket on the core conveyor. Maintaining consistent upright on-edge orientation allows for effective continued alignment of items being processed through the inductor station, and therefore reduces the risk of misfeeds and enhances throughput.

In the preferred embodiments of the invention, the feeding assembly, which feeds the assorted items along the feeder tray to the loading mechanism, includes two pushing mechanisms: namely, a main pushing mechanism and a secondary pushing mechanism. The operation of the main pushing mechanism and the secondary pushing mechanism are coordinated electronically to facilitate substantially continuous feeding of assorted items to the loading mechanism. More specifically, the main pushing mechanism uses a pushing hand mounted for travel along the feeder tray between a home location and a stop location for the main pushing mechanism. The home location for the main pushing mechanism is located on the side of the feeder tray opposite the discharge end of the feeder tray. The main pushing mechanism is positioned at its home location when the feeder tray is ready to receive the next charge of assorted items. The main pushing mechanism then applies pressure against the charge to move the charge of assorted items along the feeder tray to the loading mechanism at the discharge end of the feeder tray. As mentioned, the endmost item in the charge is loaded onto the loading mechanism. In order to facilitate appropriate cooperation between the pushing mechanism and the loading mechanism, the pushing mechanism pushes in a controlled pulsating manner such that the pushing pressure is relieved when the endmost item is loaded from the feeder tray onto the loading mechanism. The pushing pressure is reapplied after the endmost item has been loaded onto the takeaway conveyor and the loading mechanism is ready to be loaded with the next item in the charge. The controlled pulsating action is preferred because it is desirable to relax the tension in the charge after the endmost item is loaded into the loading mechanism in order to reduce frictional and normal forces operating between the endmost item and the next item in the charge. The relaxation improves the reliability of the loading mechanism and helps to prevent misalignment and misfeeds. The secondary pushing mechanism has a retractable pushing hand that is mounted for travel along the feeder tray between a home location for the secondary pushing mechanism and the discharge end of the feeder tray. The home location for the secondary pushing mechanism is located between the home location for the main pushing mechanism and the discharge end of the feeder tray, and preferably substantially closer to the discharge end of the feeder tray. As the main pushing mechanism moves the charge along the feeder tray and becomes close to the discharge end of the feeder tray, the secondary pushing mechanism is implemented as a substitute for the main pushing mechanism. After substitution, the main pushing mechanism returns to its home location ready to accept the next charge of assorted items while the secondary pushing mechanism continues to feed the remainder of the charge to the loading mechanism. The pushing hand for the secondary pushing mechanism retracts for travel under the floor of the feeder tray as it returns towards its home position prior to substitution for the main pushing mechanism, thus avoiding interference with assorted items in the feeder tray as it returns. When it is time for the secondary pushing mechanism to substitute for the main pushing mechanism, the fingers on the pushing hand for the secondary pushing mechanism extend upward through slots in the feeder tray and into openings in the hand for the main pushing mechanism. The secondary pushing mechanism then continues to feed the charge towards the loading mechanism, and the main pushing mechanism returns to its home position in order to receive the next charge of assorted items.

In another embodiment, the feeding assembly uses a stabilizing hand to prevent the endmost items from tipping in the feeder tray. The stabilizing hand is preferably mounted for travel along the feeder tray between the home location for the secondary pushing mechanism and the discharge end of the feeder tray. The stabilizing hand is retractable, like the hand for the secondary pushing mechanism. While movement of the main pushing mechanism and movement of the secondary pushing mechanism are independently powered and controlled for coordinated operation (preferably using pneumatic controls to slide the mechanisms along the linear bearings), the movement of the stabilizing hand is not powered. Rather, the stabilizing hand travels towards the discharge end of the feeder tray when it is pushed by a charge of assorted items being pushed by the main pushing mechanism. In this manner, the stabilizing hand prevents the endmost item in the charge from tipping in the feeder tray. When the stabilizing hand approaches the remaining portion of the previous charge on the loading mechanism, the stabilizing hand retracts. The stabilizing hand then returns to its home position, which is the home position for the secondary pushing mechanism, when it is pushed by the retracted secondary pushing mechanism returning to its home position. Preferably, separate pneumatic lifts control the retraction of the pushing hand for the secondary pushing mechanism and the retraction of the stabilizing hand, although it is preferred that these pneumatic lifts be operated in unison. In this embodiment, the openings in the hand of the main pushing mechanism should be sufficiently large to accommodate both the fingers on the pushing hand for the secondary pushing mechanism and the fingers on the stabilizing hand.

The preferred loading mechanism is designed to ensure that only the endmost item from the charge of assorted items on the feeder tray is loaded onto the takeaway transporter per each loading cycle. This sometimes can be difficult because friction between adjacent items within the group is often significant, especially when boxed items are wrapped in film. The preferred loading mechanism overcomes the friction attraction forces and substantially reduces the probability of misfeeds and misalignment. The loading mechanism comprises a lift to lift the endmost item of the charge. A substantially vertical guide plate is located adjacent the lift and substantially perpendicular to the feeder tray. A vertical stripping conveyor is located adjacent the guide plate on the side opposite the lift. The stripping conveyor has cleats extending from the conveyor beyond the guide plate in the direction of the lift. The stripping conveyor is preferably an indexing motion stripping conveyor which is computer-controlled to coordinate operation with the core conveyor. The feeding assembly pushes the endmost item against the guide plate and onto the lift. The item on the lift is lifted and then the stripping conveyor indexes forward to push the item onto the takeaway transporter.

The lift is preferably a pivotally mounted lever and has an actuation arm for moving the lever between a lowered position and a raised position. The top surface of the lever preferably has a width that is less than the width of assorted items fed to the lift, thereby ensuring that it lifts only the endmost item in the charge on the feeder tray. The loading mechanism also preferably includes a holdback member that is located between the lift and the takeaway transporter. The holdback member is a rail or some other object defining a horizontal obstacle for items lying in the feeder tray immediately upstream of the infeed to the takeaway transporter. The height of the horizontal obstacle is preferably no higher than the loading height for the takeaway transporter. When the endmost item is loaded onto the takeaway transporter, the holdback member holds subsequent items in the charge in place within the feeder tray even if there is significant frictional attraction between adjacent items. The lift raises the endmost item so that the lower edge of the item is raised at least as high as the loading height of the takeaway transporter and above the horizontal obstacle of the holdback member, and at the appropriate time the stripping conveyor pushes the item onto the takeaway transporter.

Various other features and advantages of the invention should be apparent to those skilled in the art upon inspecting the drawings and the following description thereof. For example, the invention uses various sensors and control techniques which are particularly effective for maintaining continued reliability as well as various other features.

BRIEF DESCRIPTION OF THE DRAWINGS

Embodiments in Parent Application

New Embodiments

Figure 14:
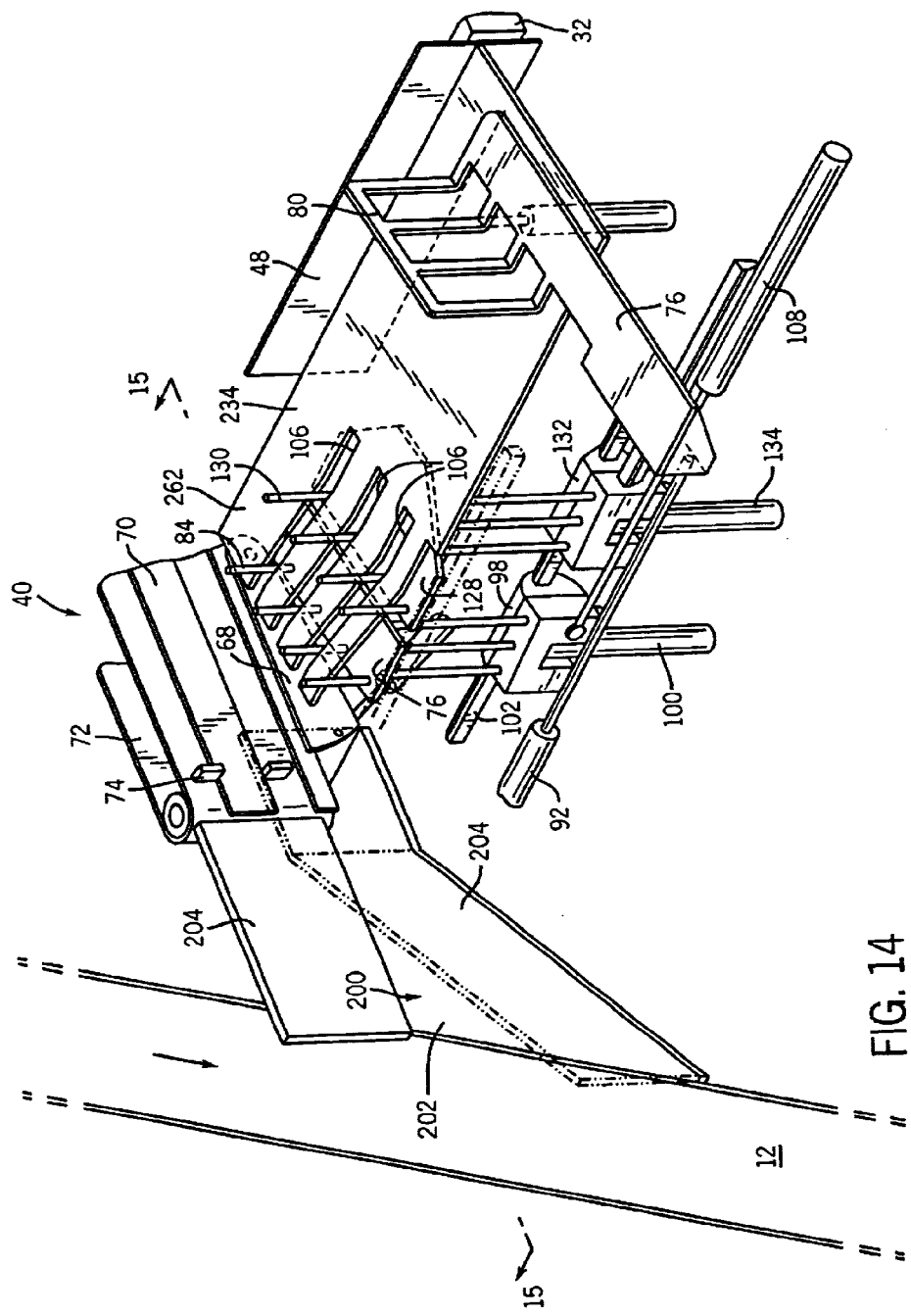

FIG. 14 is a floating perspective view of an inductor station in accordance with the third embodiment of the invention employing a takeaway chute and an inclined feeder tray.

Figure 15:
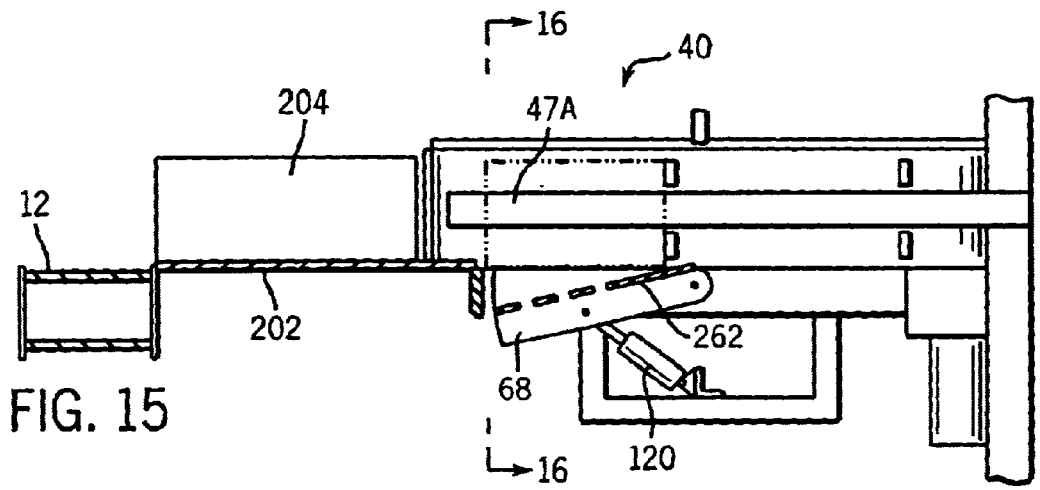

FIG. 15 is a view taken along line 15—15 in FIG. 14.

Figure 16:
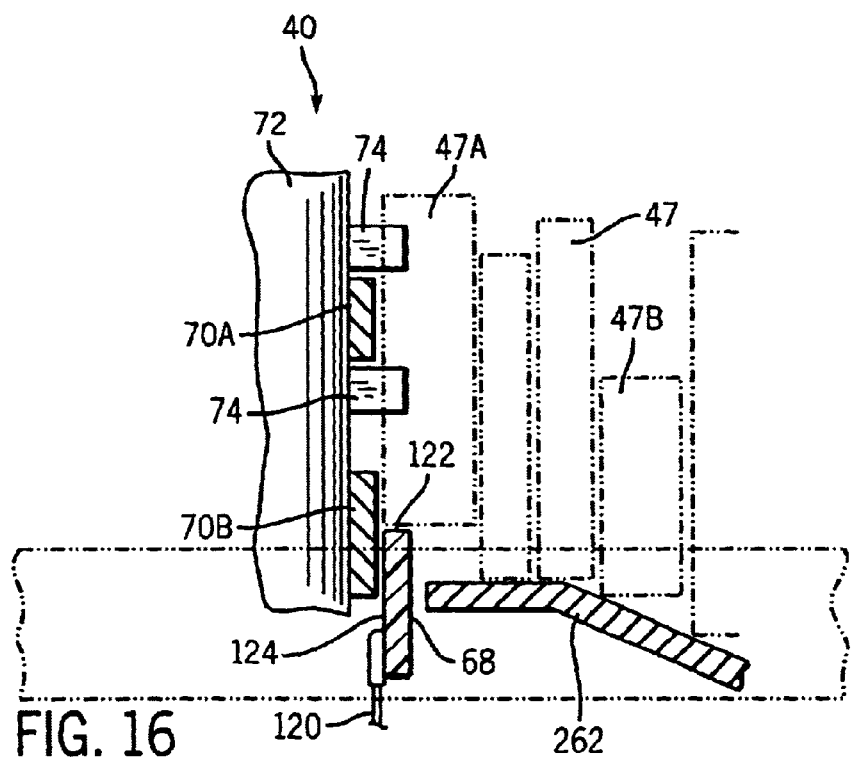

FIG. 16 is a sectional view taken along line 16—16 in FIG. 15.

DETAILED DESCRIPTION OF THE INVENTION

Embodiments in Parent Application

Figure 1:
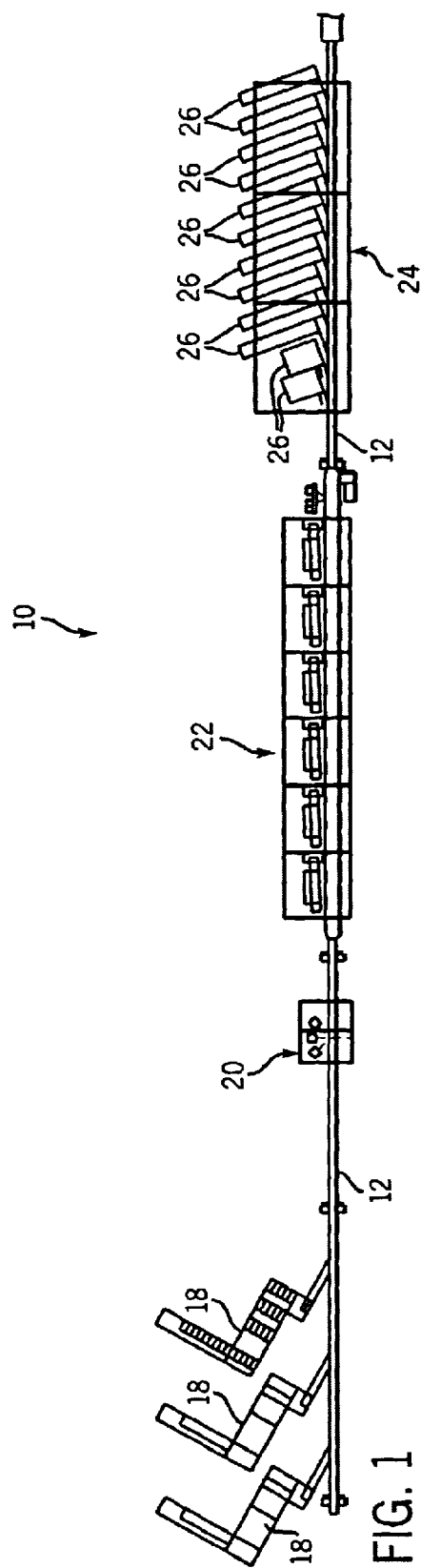
FIG. 1 is a top schematic view of a sortation conveying system that uses a plurality of inductor stations designed in accordance with the invention.

FIG. 1 illustrates a sortation conveying system 10 that is capable of fulfilling orders of intermingled items having assorted sizes, such as assorted books, intermingled with video cassette containers, compact disc containers, packaged software, or the like. The sortation conveying system 10 includes a core conveyor belt 12 that extends for essentially the entire length of the sortation conveying system 10, e.g. approximately 300 feet. The core conveyor belt 12 is divided into pockets 14 of equal length (see reference numeral 14 in FIG. 2). Each pocket 14 is separated by a cleat 16, FIG. 2, on the conveyor belt 12. The core conveyor 12 operates at a relatively high rate of speed, for example, approximately 250 parts per minute can be processed and sorted by the system 10.

Referring still to FIG. 1, the sortation conveying system 10 includes a plurality of inductor stations 18 that load items onto the core conveyor belt 12. Each of the items is loaded onto the core conveyor belt 12 standing upright on edge and into an assigned pocket 14 on the core conveyor belt 12. The core conveyor belt 12 then conveys the items single file for downstream processing and sorting. The system 10 includes a bar code reading station 20 that is able to accurately and quickly identify the item being moved by the core conveyor 12. The system 10 may also include a label application station 22 for applying a label to each item on the core conveyor 12. At the downstream end of the system 10, the items pass through a guide assembly 24 that includes a series of diverting gates or doors which are selectively operated to divert items passing along the core conveyor 12 into several stacking stations 26. FIG. 1 shows twelve stacking stations 26, each allocated to a specific outgoing order of assorted items. The computer control system for the sortation system 10 programs the guide assembly 24 to sort the items traveling on core conveyor 12 into the appropriate stacking station 26 to fulfill the assigned order. Orders typically contain up to or more than 100 assorted items. If an item on the core conveyor is not diverted in the one of the several stacking stations (e.g. the item was loaded onto the system 10 but was not required to fulfill an order), the item is sent to a downstream bin and can be reprocessed at a later time.

Figure 2:
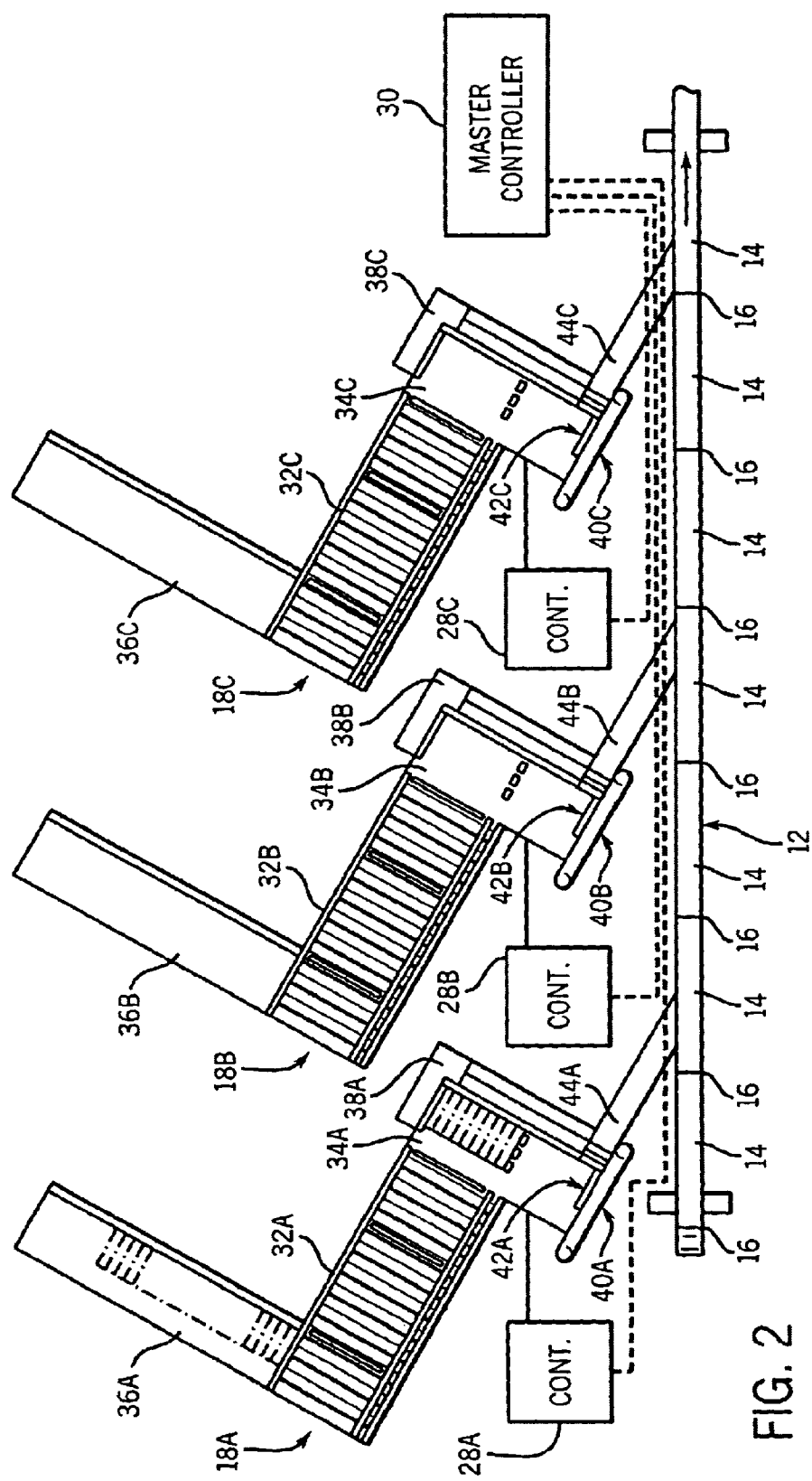
FIG. 2 is a schematic view of a plurality of inductor stations that supply items in accordance with the invention to a core conveyor of a sortation conveying system.

Referring now to FIG. 2, the operation of each of the inductor stations 18a, 18b, 18c is controlled by a dedicated programmable controller 28a, 28b, 28c. Each of the programmable controllers 28a, 28b, 28c, communicates with a master controller 30 for the system 10. The controllers 28a, 28b, 28c are programmed to independently control the operation of the respective inductor stations 18a, 18b, 18c, as well as coordinate the discharging of individual items from the respective inductor station 18 into an assigned pocket 14 on the core conveyor 12. Each inductor station 18a, 18b, 18c includes a gravity feed ramp 32a, 32b, 32c that transports charges of assorted items in sequence to a feeder tray 34a, 34b, 34c. An operator loads the charges of assorted items onto the respective gravity feed ramp 32a, 32b, 32c. Each charge contains items standing upright on edge and grouped together in series side-by-side (see for example FIG. 3). FIG. 2 shows staging areas or shelves 36a, 36b, 36c which are optional. Staging shelves 36a, 36b, 36c are useful for preparing one or more charges of assorted items prior to loading onto the gravity feed ramps 32a, 32b, 32c.

A feeding assembly 38a, 38b, 38c on each inductor station feeds assorted items in the respective feeder tray 34a, 34b, 34c to a loading mechanism 40a, 40b, 40c. The loading mechanisms 40a, 40b, 40c load items from a discharge end 42a, 42b, 42c of the respective feeder tray 34a, 34b, 34c onto a takeaway conveyor 44a, 44b, 44c one by one in a singular fashion. The endmost item in the charge of assorted items on the respective feeder tray 34a, 34b, 34c is loaded onto the takeaway conveyor 44a, 44b, 44c such that the item stands on the takeaway conveyor upright on edge. The operation of the respective loading mechanisms 40a, 40b, 40c and takeaway conveyors 44a, 44b, 44c are coordinated to transfer items into an assigned pocket 14 on the core conveyor 12 as previously mentioned. Thus, while the charges of assorted items are loaded manually by workers in a facility in a typically inconsistent manner, the inductor stations 18a, 18b, 18c are designed to provide items in single file standing upright on edge to assigned pockets 14 on the core conveyor 12 in a synchronous manner.

Figure 3:
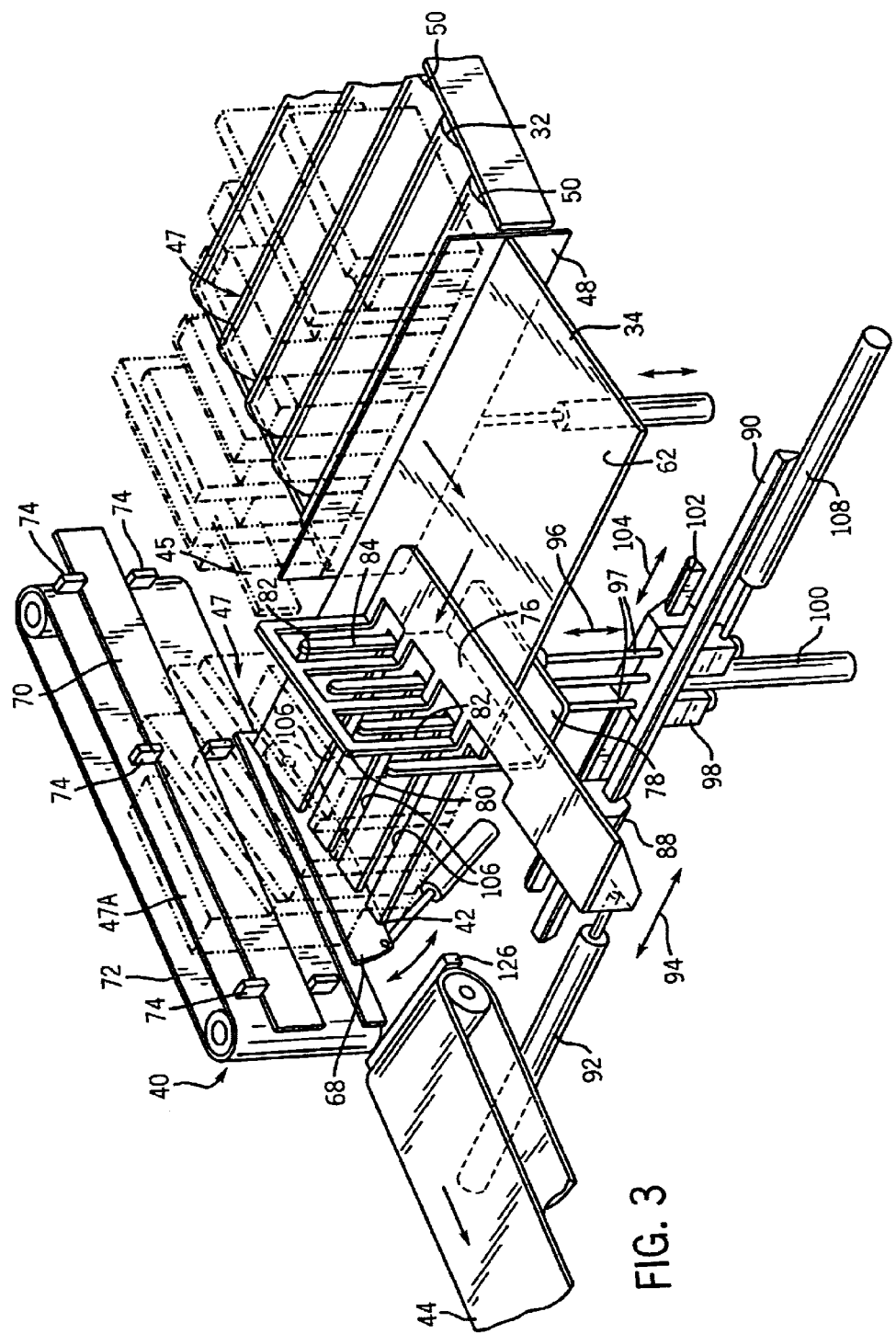
FIG. 3 is a floating perspective view of various components of an inductor station in accordance with the first embodiment of the invention.
Figure 4:
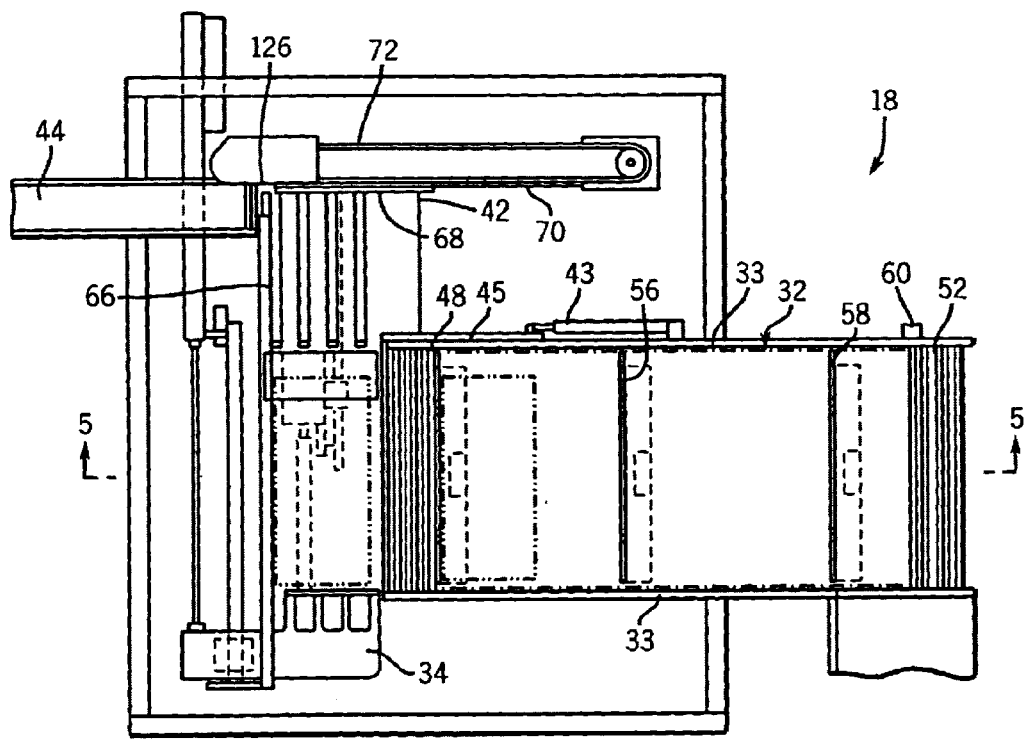
FIG. 4 is a top perspective view of an inductor station in accordance with the embodiment of the invention shown in FIG. 4.
Figure 5:
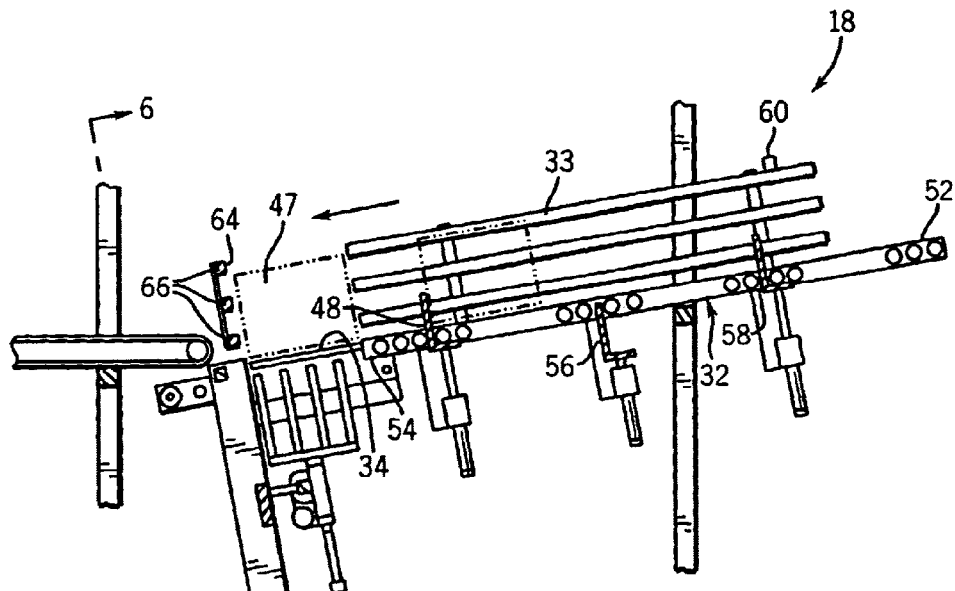
FIG. 5 is a cross-sectional view taken along line 5—5 in FIG. 4.

FIGS. 3 through 5 illustrate a first embodiment of one of the inductor stations 18 constructed in accordance with the invention. It should be recognized that each of the inductor stations 18a, 18b, 18c shown in FIG. 2 for the sortation conveying system 10 are preferably substantially identical to one another.

Referring in particular to FIGS. 3–5, a charge 47 of assorted items is shown to be held in place on the gravity feed conveyor 32 by a retractable queuing plate 48. The charge of items 47 contains an assortment of substantially rectangular items each standing upright on edge and grouped in series side-by-side. Although the invention is capable of handling rectangular items having consistent dimensions, it is designed especially to accommodate intermingled items having assorted substantially rectangular dimensions.

The gravity feed conveyor 32 includes a plurality of horizontally mounted idler rollers 50. The ramp 32 is inclined such that an infeed end 52 which receives the charges 47 of assorted items is located higher than a discharge end 54 of the ramp 32. The discharge end 54 of the ramp 32 is located adjacent a feeder tray 34. As shown best in FIGS. 4 and 5, the ramp 32 includes three retractable queuing plates 48, 56 and 58. Each of the queuing plates is able to hold a charge 47 of assorted items on the ramp 32 when positioned in a non-retracted or extended position, and retracts below the conveying surface of the idler rollers 50 to allow the charge 47 to feed downward along the ramp and eventually onto the feeder tray 34. As discussed later in connection with FIG. 13, photoelectric sensors are used to monitor whether assorted items are being held by a respective queuing plate 48, 56, 58, and the operation of the queuing plates 48, 56, 58 is controlled in response to signals from the sensors to automatically feed sequences of charges 47 to the feeder tray 34. A manual switch 60 is provided for the first queuing plate 58 on the ramp 32. An operator of the inductor station 18 pushes the manual switch 60 when a charge 47 is fully loaded against the first queuing plate 58. After the manual switch 60 has been pushed, the control system is enabled to retract the first queuing plate 58 in accordance with the signals from the proximity sensors, as well as operation of downstream components of the inductor station 18.

The gravity feed ramp 32 includes longitudinal guide rails 33 on either side of the rollers 50 for guiding the charges 47 of assorted items down the gravity feed ramp 32. The guide rails 33 on the side of the ramp 32 closest to the discharge end 42 of the feeder tray 34 preferably terminate at a location prior to the location where the gravity feed ramp 32 intersects the feeder tray 34, see FIG. 5. In this manner, the rail 33 does not interfere with movement of assorted items 47 along the feeder tray 34. However, a guide wall extension member 45 (see FIGS. 3 and 4) is provided along the longitudinal ramp guide rail 33 located closest to the discharge end 42 of the feeder tray 34. The guide rail extension member 45 is retractable. Its position is controlled by pneumatic cylinder 43. The retractable guide wall extension member 45 is shown in a retracted position in FIGS. 3 and 4 such that assorted items are able to be pushed along the feeder tray 34 towards the discharge end of the feeder tray 34 without interference from the guide wall extension member 45. However, the pneumatic cylinder 43 extends the guide wall extension member 45 over the feeder tray 34 when a charge 47 is being loaded from the gravity feed ramp 32 onto the feeder tray 34. The extended guide wall extension member 45 prevents tipping of the endmost items in the charge 47 while the charge 47 is being loaded onto the feeder tray. The feeder tray 34 preferably has a floor 62 that is inclined at the same angle as the gravity feed ramp 32. The feeder tray 34 also includes a backstop 64, FIG. 5, which facilitates alignment of the assorted items in the feeder tray 34. Preferably, the backstop includes rails 66 that provide an alignment plane for assorted items in the feeder tray 34. The backstop alignment plane should be substantially perpendicular to the floor 62 of the feeder tray 34. Preferably, the floor 62 and the backstop rails 66 are made of plastic materials having a relatively high level of lubricity in order to minimize frictional forces acting on assorted items being moved along the feeder tray 34.

FIG. 3 illustrates the feeding assembly feeding a charge 47 of assorted items along the feeder tray 34 to the loading mechanism 40 located at the discharge end 42 of the feeder tray 34. In FIG. 3, the endmost item 47a in the charge on the feeder tray 34 is loaded onto a lifting lever 68 which constitutes part of the loading mechanism 40. A substantially vertical guide plate 70 is located adjacent the lifting lever 68 on the side opposite the feeder tray 34. The feeding assembly pushes the charge 47 of assorted items to press the endmost item 47a flush against the vertical guide plate 70.

A vertical stripping conveyor belt 72 is located adjacent the vertical guide plate 70 on the side of the guide plate 70 opposite the lifting lever 68. The stripping conveyor has a plurality of cleats 74 which extend from the stripping conveyor beyond the vertical guide plate in the direction of the lifting lever 68. The stripping conveyor belt 72 is preferably an indexing motion conveyor which is computer controlled. When the lifting lever 68 lifts the endmost item 47a in the charge 47, the indexing motion stripping conveyor 72 moves at the appropriate time and cleats 74 on the stripping conveyor belt 72 push the endmost item 47a onto the takeaway conveyor 44.

The feeding assembly preferably comprises at least two pushing mechanisms 76, 78: namely, a main pushing mechanism 76 and a secondary pushing mechanism 78. The main pushing mechanism 76 includes a pushing hand 80 attached to the body of the pushing mechanism 76. The hand 80 for the main pushing mechanism 76 includes openings 82 in which fingers on a hand 84 for the secondary pushing mechanism 78 can reside when the main pushing mechanism 76 and the secondary pushing mechanism 78 are located at the same or nearly the same location along the feeder tray 34. The operation of the main pushing mechanism 76 and the secondary pushing mechanism 78 are coordinated to facilitate substantially continuous feeding of assorted items to the loading mechanism 40 at the discharge end 42 of the feeder tray 34.

As shown best in FIG. 3, the body of the main pushing mechanism 76 is mounted to a bearing block 88. An arm of a pneumatic cylinder 92 is connected to the body 76 of the primary pushing mechanism and moves the bearing block 88 linearly along a rail 90, and thus moves the hand 80 for the main pushing mechanism along the feeder tray 34. The linear motion of the main pushing mechanism 76 is indicated by arrow 94 in FIG. 3. The actuation of the pneumatic cylinder 92 is computer controlled.

The hand 84 for the secondary pushing mechanism 78 is retractable as depicted by arrow 96 in FIG. 3. The arm of pneumatic cylinder 100 controls the vertical position of the body and hand 84 of the secondary pushing mechanism 78. The arm of the pneumatic cylinder 100 as well as guide rails 97 are mounted to slide through bearing block 98 for the secondary pushing mechanism 78. The bearing block 98 is mounted to a rail 102 for linear horizontal motion as depicted by arrow 104 in FIG. 3. The arm of pneumatic cylinder 108 is connected to bearing block 98 for the secondary pushing mechanism and controls the horizontal position of the secondary pushing mechanism along the feeder tray 34. Note that the body of the retractable secondary pushing mechanism 78 is located below the floor 62 of the feeder tray 34, whereas the body 76 of the main pushing mechanism is preferably located above the floor 62 of the feeder tray 34. The floor 62 of the feeder tray 34 includes slots 106 to accommodate motion of the fingers 84 of the secondary pushing mechanism 78 when the secondary pushing mechanism 78 moves towards the discharge end 42 of the feeder tray 34.

Figure 6A:
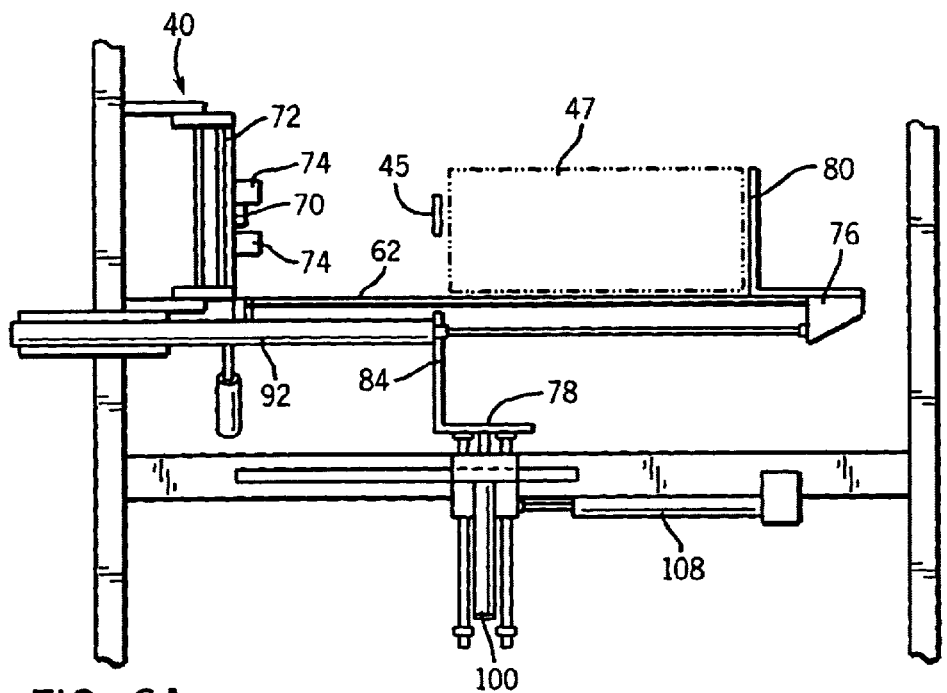
FIGS. 6a–6e are schematic views taken along line 6—6 in FIG. 5 which show the coordinated operation of a main pushing mechanism and a secondary pushing mechanism of a feeding assembly in accordance with the embodiment of the invention shown in FIG. 4.
Figure 6B:
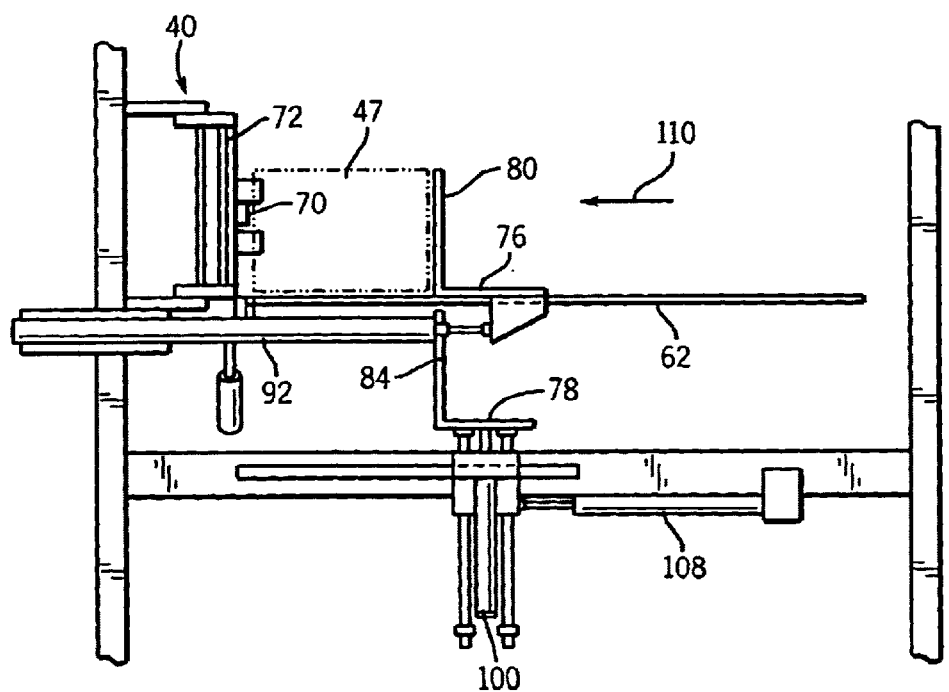

The operation of pneumatic cylinders 92, 100 and 108 is coordinated in order to continuously feed assorted items 47 along the floor 62 of the feeder tray 34 to the loading mechanism 40. FIGS. 6a–6e schematically represent coordinated operation of the main pushing mechanism 76 and the secondary pushing mechanism 78. In FIG. 6a, the main pushing mechanism is located in its home location such that the hand 80 for the main pushing mechanism 76 is ready to accept the next charge 47 of assorted items from the gravity feed ramp 32. FIG. 6a shows guide wall extension member 45 being extended to guide the charge 47 as it is fed onto the feeder tray 34. The pushing hand 84 for the secondary pushing mechanism 78 is retracted so that the pushing hand 84 is located below the floor 62 of the feeder tray 34. Next, the guide wall extension member 45 is retracted, and the pneumatic cylinder 92 begins to drive the main pushing mechanism 76 along the feeder tray 32, thus pushing the charge 47 of assorted items towards the loading mechanism 40. FIG. 6b illustrates movement of the main pushing mechanism 76 in the direction of arrow 110. In FIG. 6b, several items have been loaded onto the takeaway conveyor from the charge 47 of assorted items. Note that the hand 80 for the main pushing mechanism has pushed the endmost item in the charge 47 against the guide rail 70 to approximately position the item on the lift for the loading mechanism 40. After the endmost item in the charge 47 is appropriately positioned on the lift for the loading mechanism 40, the pneumatic cylinder 92 for the main pushing mechanism 76 momentarily relieves pulling pressure on the mechanism 76. Relieving the pressure allows tension in the charge 47 to relax and reduces friction and normal forces on the endmost item in the charge 47 so that the loading mechanism 40 works more reliably. After the endmost item of the charge 47 has been loaded onto the takeaway conveyor, the cylinder 92 again reapplies pressure to move the main pushing mechanism 76 and push the charge 47 towards the loading mechanism 40. Note that FIG. 6b shows the hand 84 for the secondary pushing mechanism 78 in a retracted position in which the hand 84 is located below the floor 62 of the feeder tray 34. In FIGS. 6a and 6b, the secondary pushing mechanism 78 is retracted and located in its home position.

Figure 6C:
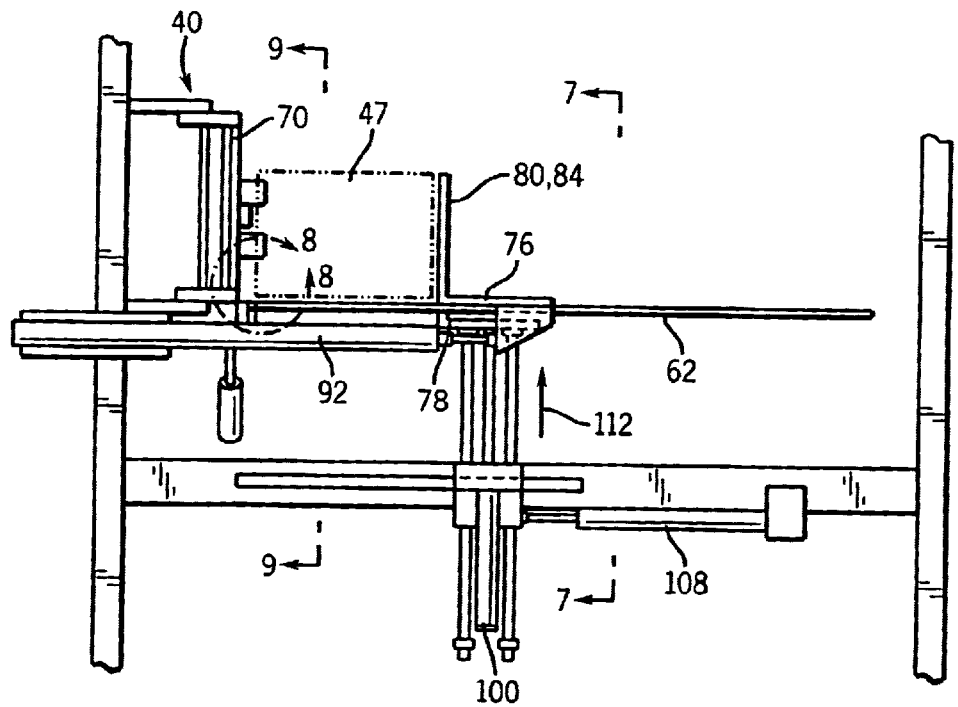
Figure 6D:
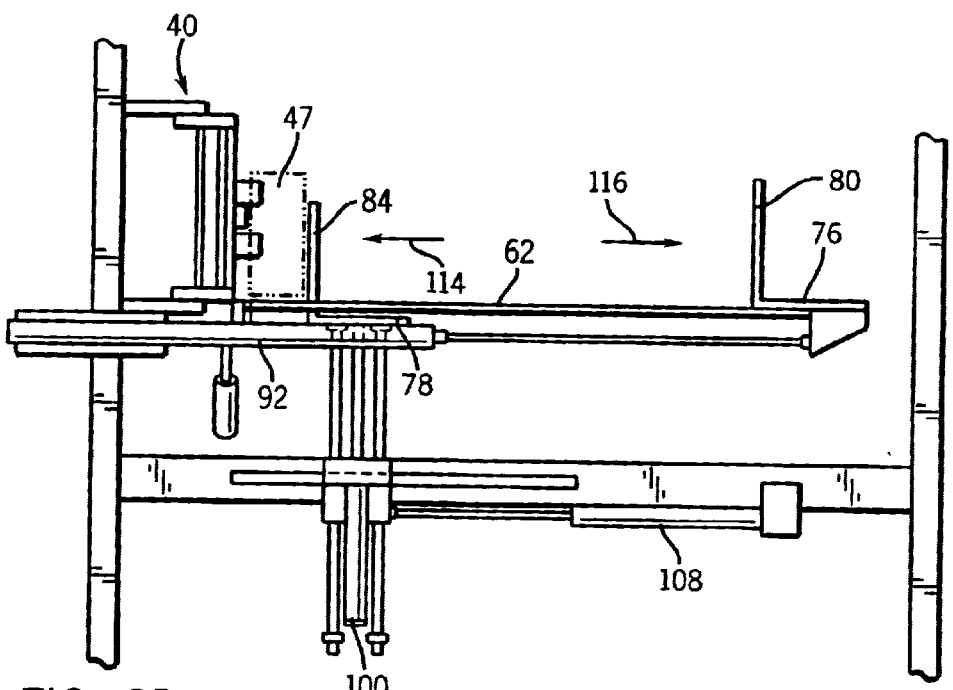
Figure 6E:
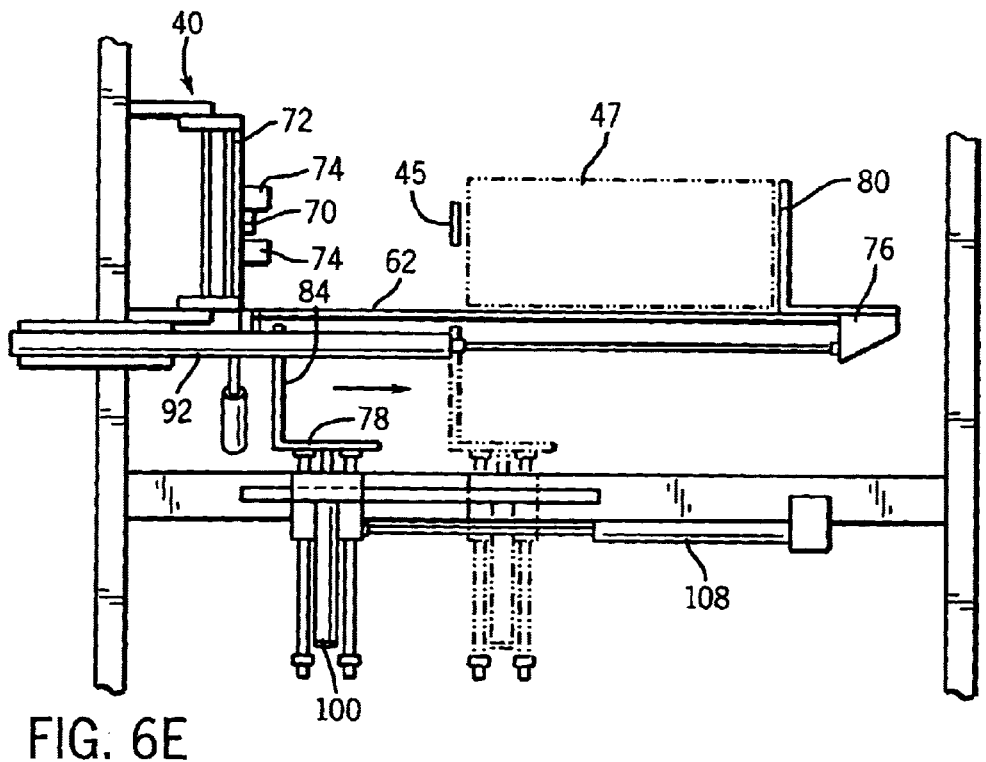
Figure 7:
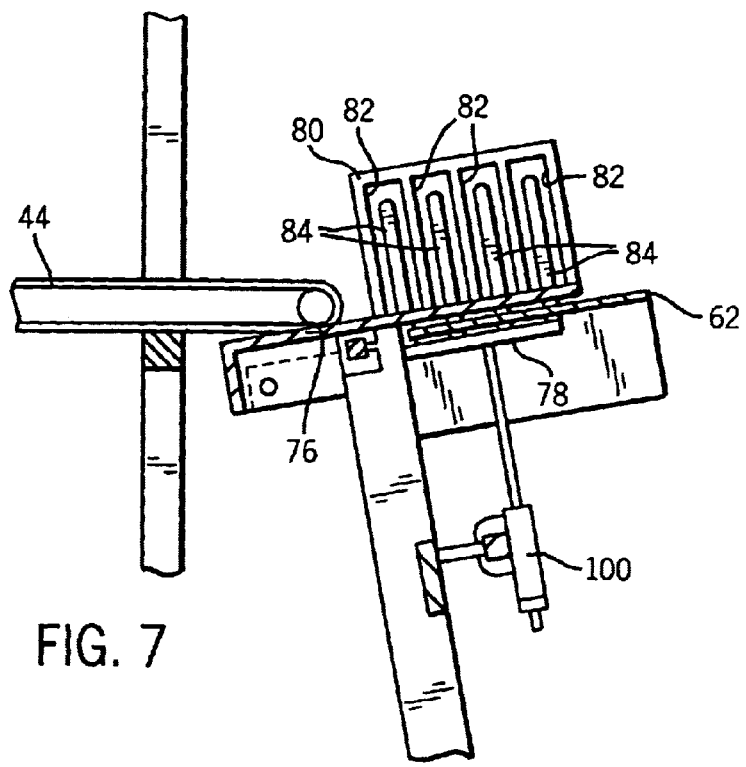
FIG. 7 is a view taken along line 7—7 in FIG. 6c which illustrates the nesting of fingers on a pushing hand for the secondary pushing mechanism within openings in a pushing hand for the main pushing mechanism.

Referring now to FIG. 6c, the pneumatic cylinder 100 is actuated to extend the hand 84 for the secondary pushing mechanism above the floor 62 of the feeder tray as depicted by arrow 112. At this point in the process, the fingers on the hand 84 for the secondary pushing mechanism 78 typically nest within openings 82 in the hand 80 for the main pushing mechanism 76 (See FIG. 7). After the secondary pushing mechanism 78 is raised, the secondary pushing mechanism 78 substitutes for the main pushing mechanism 76 and continues feeding the charge 47 of assorted items to the loading mechanism 40 substantially in the same manner as discussed previously with respect to the main pushing mechanism 76. FIG. 6d shows the next stage in the process in which the secondary pushing mechanism 78 continues to feed assorted items in the charge 47 to the loading mechanism 40 as depicted by arrow 114, and the main pushing mechanism 76 returns to its home position as depicted by arrow 116. FIG. 6e shows the guide rail extension 45 being extended, and the feeder tray 34 accepting the next charge of assorted items 47. FIG. 6e also shows a situation in which the loading mechanism 40 has exhausted the previous charge prior to the next charge being fed to the loading mechanism. The cylinder 100 for the secondary pushing mechanism 78 is actuated to retract the hand 84 for the secondary pushing mechanism 78, and then cylinder 108 is actuated to return the secondary pushing mechanism 78 to its home position. Although the situation illustrated in FIG. 6e can occur in cases in which subsequent charges 47 are loaded onto the feeder tray in an untimely fashion, it is preferred that the feeding of items to the loading mechanism 40 be substantially continuous.

Figure 8:
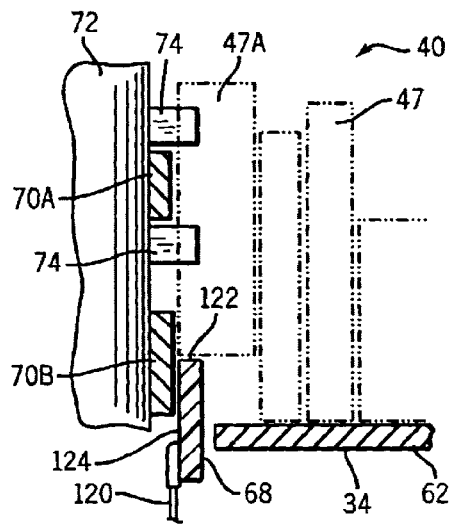
FIG. 8 is a detailed view of the area depicted by arrows 8—8 in FIG. 6c which illustrates the loading of an endmost item of a charge of assorted items on the feeder tray onto a lift as in accordance with the invention.
Figure 9:
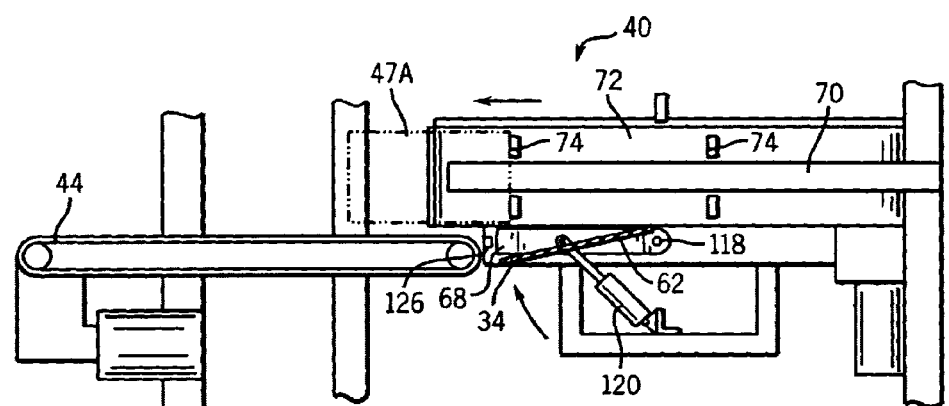
FIGS. 9 and 10 are schematic views illustrating the operation of the lift.
Figure 10:
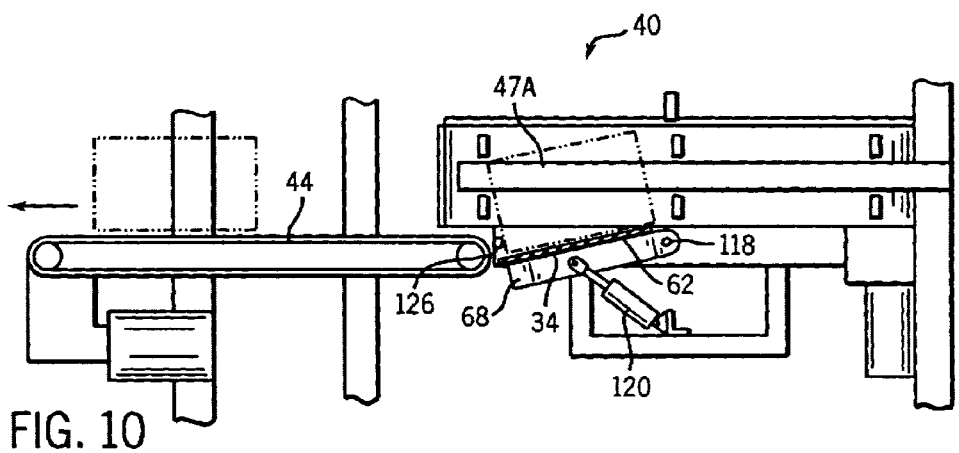

The operation of the loading mechanism 40 is now described in connection with FIGS. 8–10. As previously mentioned, the loading mechanism 40 includes a lever 68 that is pivotally mounted about pivot point 118. An actuator 120, preferably a pneumatic cylinder, is connected to the lever 68 and moves the lever 68 between a lowered position, FIG. 10 and a raised position, FIG. 9. Referring in particular to FIG. 8, the pivotable lever 68 has a top surface 122. The width of the top surface 122 is less than the width of assorted items 47 fed to the lift. In this manner, the lift lever 68 lifts only the endmost item 47a from the charge 47 of assorted items otherwise standing on the floor 62 of the feeder tray 34. The pivotable lifting lever 68 includes an inside surface 124 which moves in a plane parallel to the vertical guide plate 70 and is immediately adjacent to the vertical guide plate 70. Note that the vertical guide plate 70 has an upper portion 70a and a lower portion 70b, see FIG. 8. The endmost item 47a in the charge 47 is kept an upright position by the upper 70a and lower 70b portions of the guide plate 70 as the item is loaded onto the lever 68, and also while the lever 68 lifts the endmost item 47a.

The loading mechanism 40 also includes a holdback member 126 (see FIGS. 3, 4, 9, 10). The holdback member 126 is preferably an extension of the lowest backstop bar 66. The holdback member 126 is located between the lifting lever 68 and the infeed for the takeaway conveyor belt 44. The holdback member defines a horizontal obstacle for items located in the feeder tray 34 immediately in front of the infeed to the takeaway conveyor belt 44 (see FIG. 10). The height of the horizontal obstacle should be no greater than a loading height for the takeaway conveyor belt 44. The front edges of the assorted items 47 in the feeder tray 34 are positioned lower than the loading height of the takeaway conveyor belt 44 and the holdback member 126 prevents these items from moving forward against the takeaway conveyor belt 44. This is particularly important in order to counteract frictional attraction forces between adjacent items when the endmost item 47a is loaded onto the takeaway conveyor 44.

When the lever 68 is in the lowered position (FIG. 10), the lifting lever 68 is preferably flush with the floor 62 of the feeder tray 34. When the lifting lever 68 is lifted to the raised position (FIGS. 8 and 9), the endmost item 47a in the charge 47 is lifted such that the lower edge of the item 47a is raised to the loading height of the takeaway conveyor belt 44 and above the holdback member 126. Cleats 74 on the stripping conveyor 72 then push the item 47a onto the takeaway conveyor 44 as shown in FIG. 9. Note that subsequent items in the charge 47 remain with their lower edge on the floor 62 of the feeder tray 34 when the loaded item 47a is lifted by the pivotable lifting lever 68.

Figure 11:
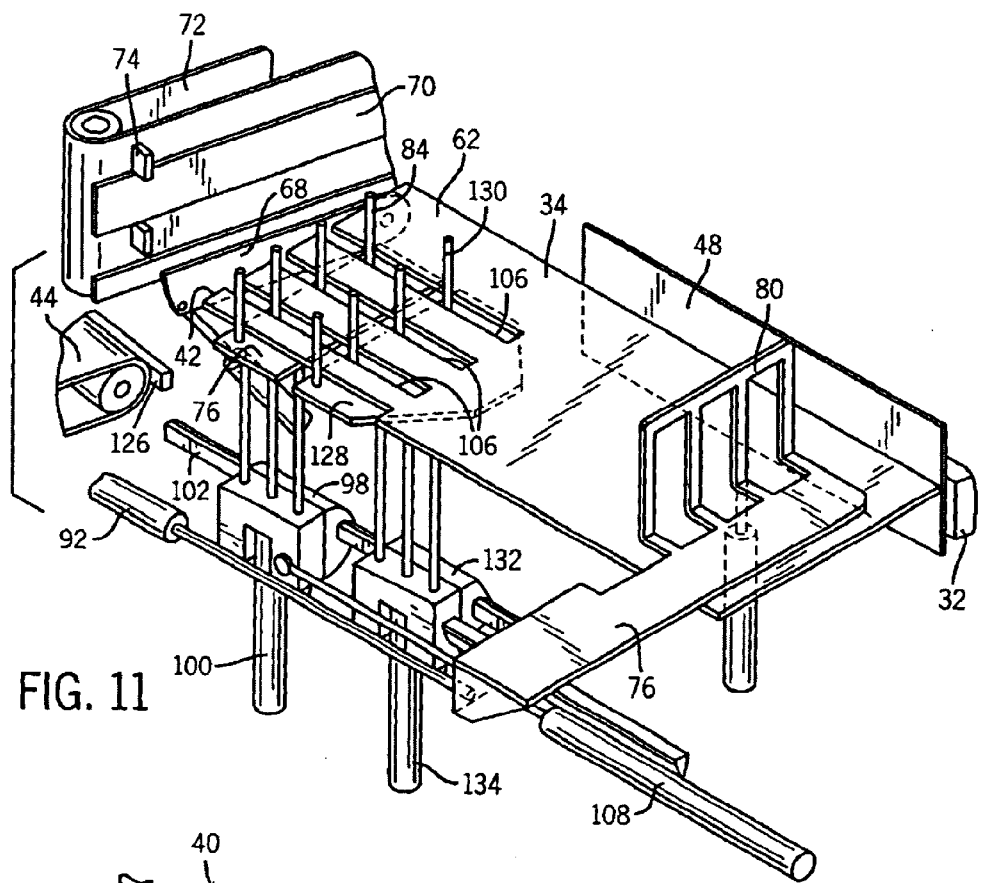
FIG. 11 is a floating perspective view of an inductor station in accordance with the second embodiment of the invention in which the feeder mechanism includes a retractable stabilizing hand.
Figure 12A:
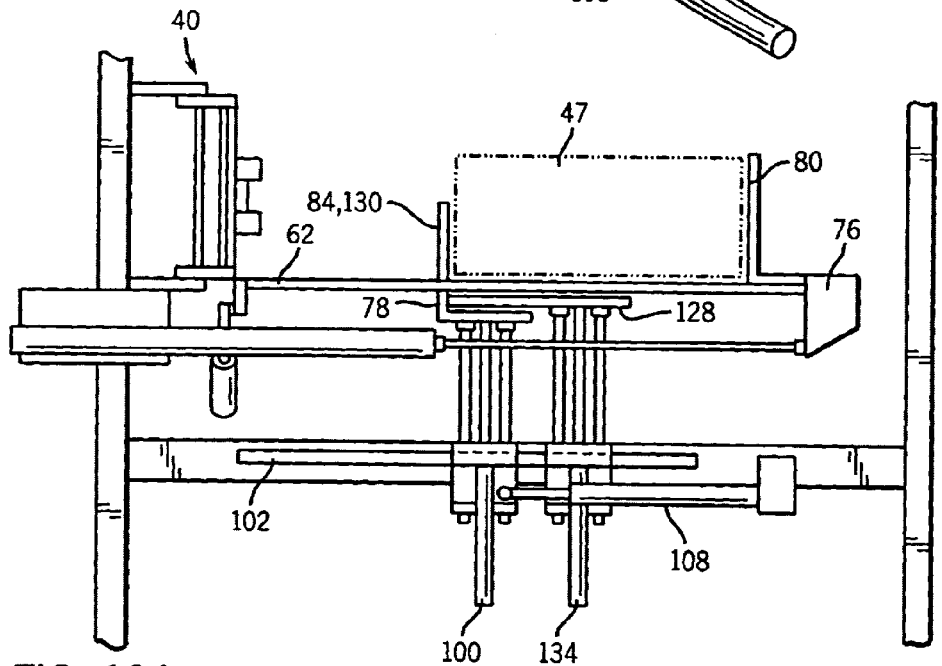
FIGS. 12a–12g are schematic drawings illustrating the coordinated operation of the pushing hands for the main pushing mechanism and secondary pushing mechanism as well as a stabilizing hand in accordance with the embodiment of the invention shown in FIG. 11.
Figure 12B:
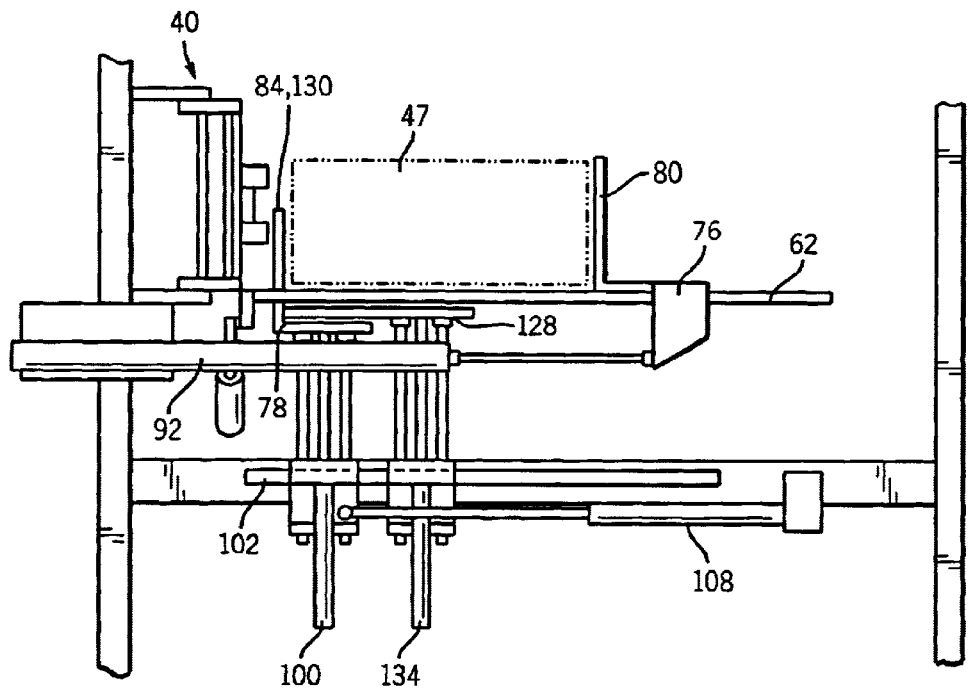
Figure 12C:
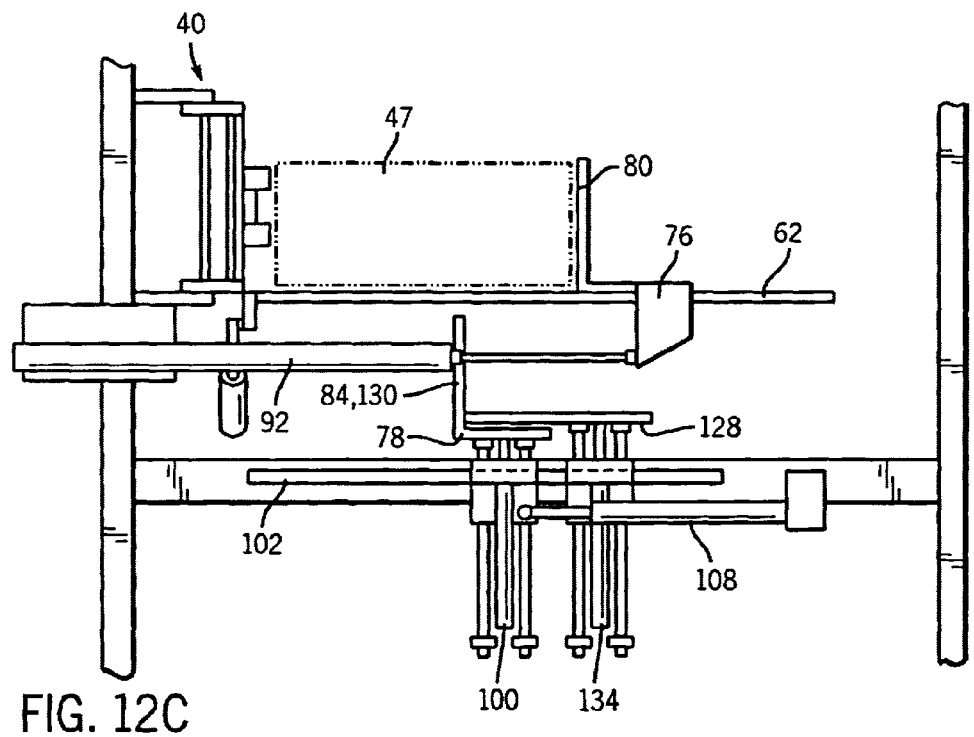
Figure 12D:
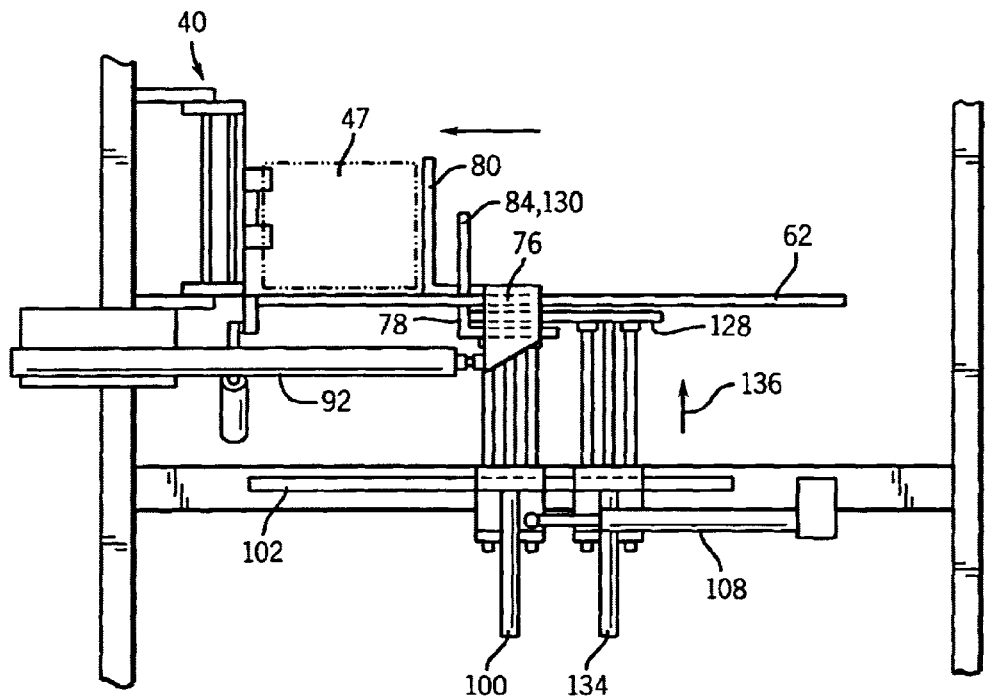
Figure 12E:
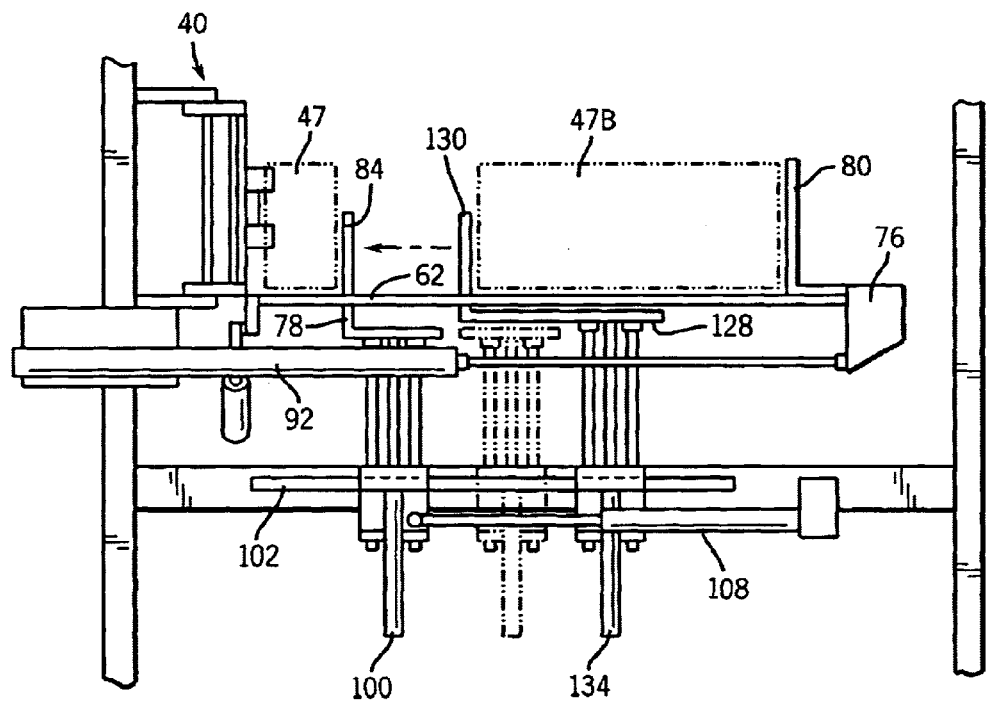
Figure 12F:
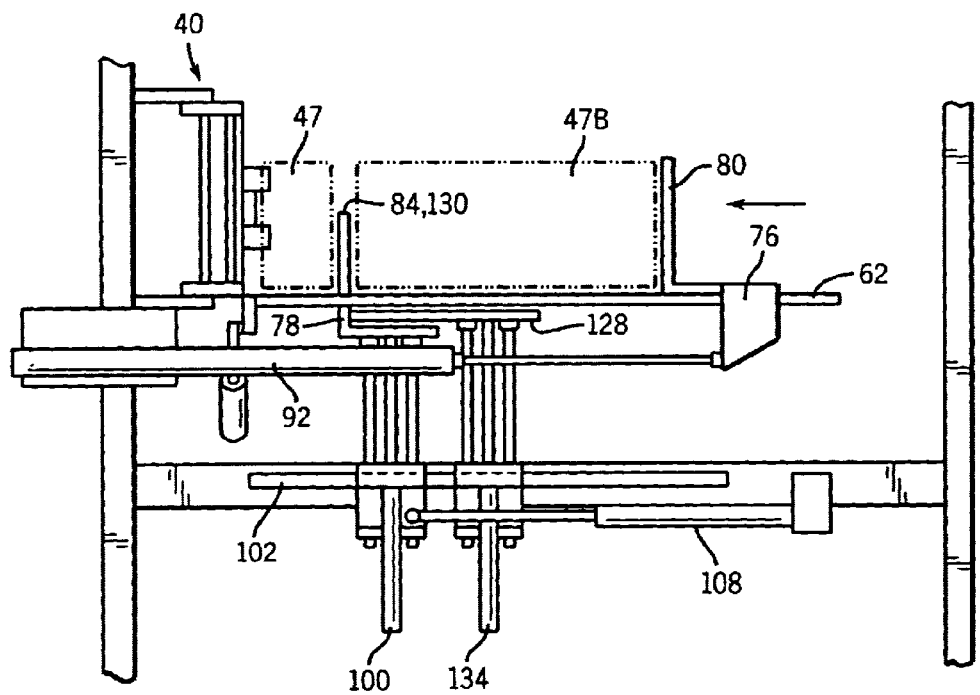
Figure 12G:
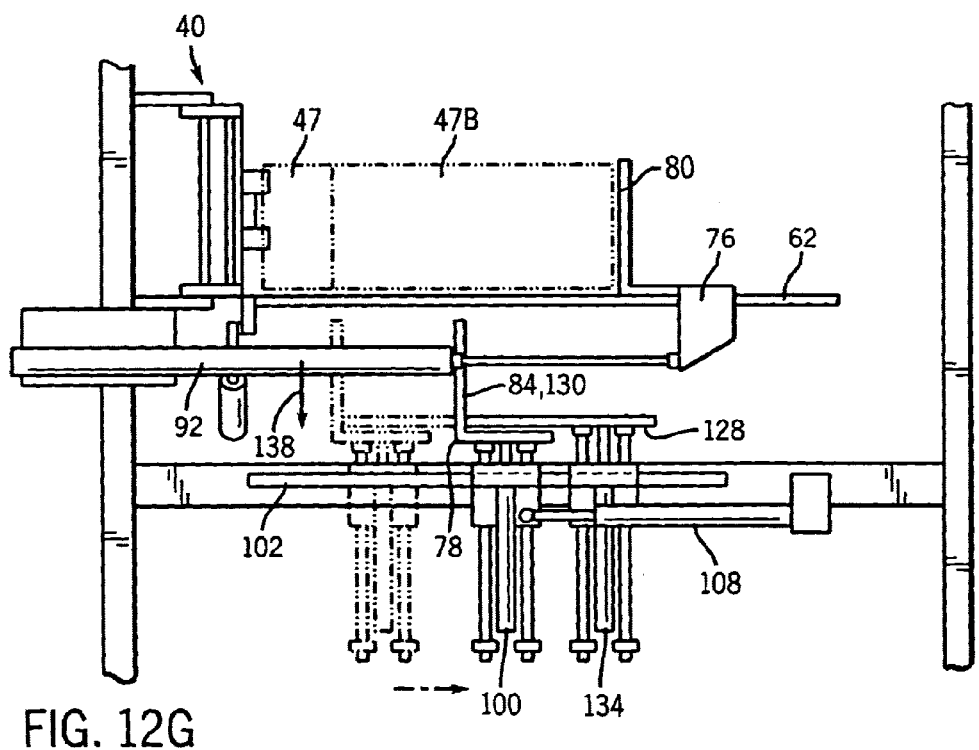
Figure 13:
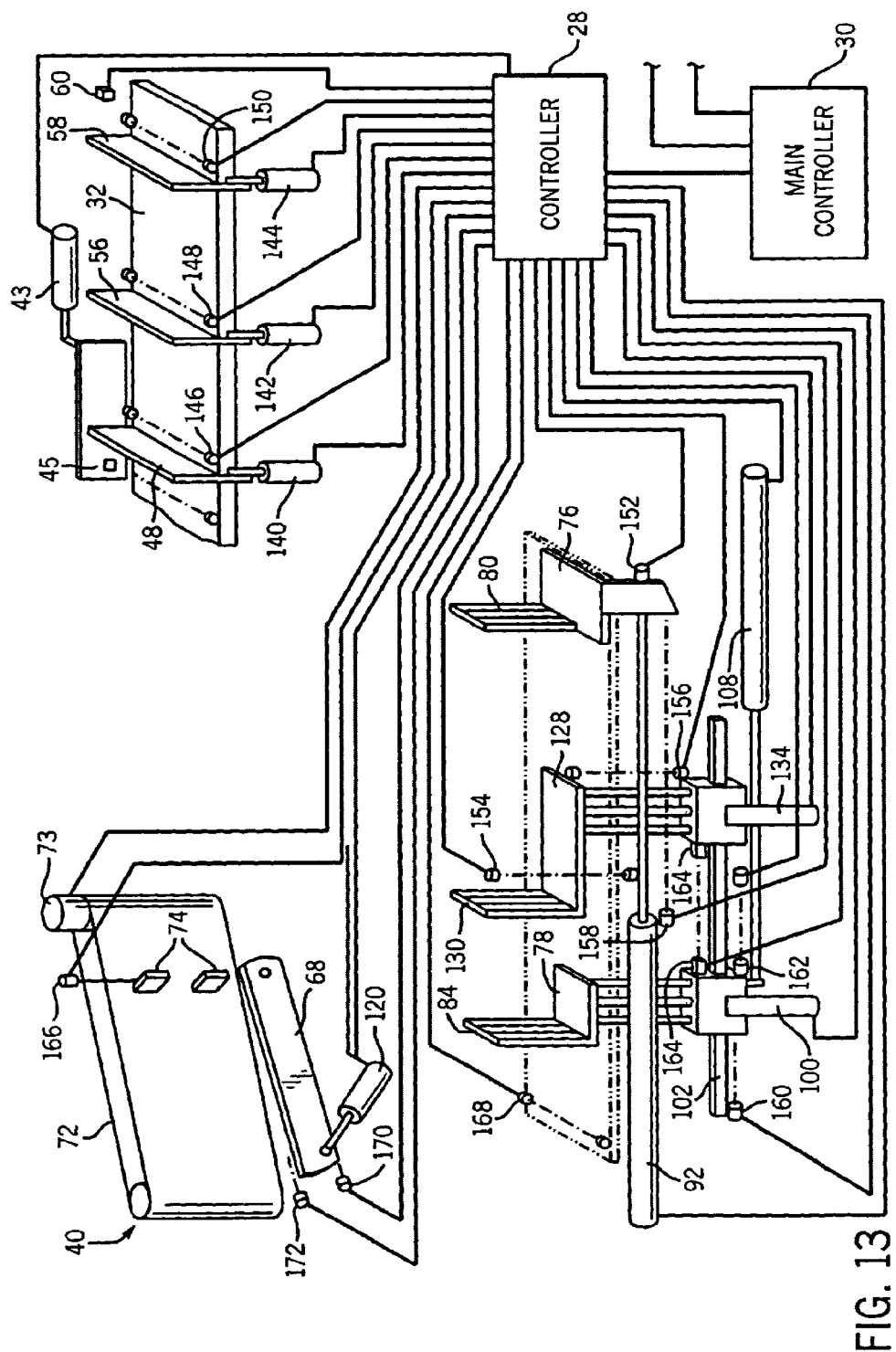
FIG. 13 is a schematic drawing illustrating an electronic control system for controlling the operation of the inductor station.

FIGS. 11–13 relate to a second embodiment of the invention in which the feeding assembly employs the use of a retractable stabilizing hand 128. In many ways, the embodiment shown in FIG. 11 is similar to the embodiment shown in FIG. 3 and similar reference numerals are used where appropriate. The stabilizing hand 128 includes fingers 130 which pass through the same slots 106 as the fingers on the hands 84 for the secondary pushing mechanism. The stabilizing hand is mounted for vertical sliding movement to a bearing block 132. The bearing block 132 is mounted to the same rail 102 as the bearing block 98 for the secondary pushing mechanism 102. An arm for a pneumatic cylinder 134 is mounted to the mounting block 132 and connected to the stabilizing hand 128. The pneumatic cylinder 134 controls vertical movement for the retraction and vertical extension of the stabilizing hand 128. The pneumatic cylinder 134 which raises and lowers the stabilizing hand 128 is separate from the pneumatic cylinder 100 which raises and lowers the hand 84 for the secondary pushing mechanism 76, however, it is preferred that theses cylinders 100, 134 be controlled in unison so that the hands 128, 84 retract and extend vertically in unison.

The operation of the feeding assembly shown in FIG. 11 having a stabilizing hand 128 is now discussed in connection with FIGS. 12a–12g. FIGS. 12a–12c illustrate a start-up mode. In FIG. 12a, the hand 84 for the secondary pushing mechanism 78 and the fingers 130 for the stabilizing hand 128 are extended vertically and present above the floor 62 of the feeder tray 34 in the home position for the stabilizing hand 128. Also, the hand 80 for the main pushing mechanism 76 is located in its home position, and the feeding assembly is ready to accept the first charge 47 of items between the hand 80 for the main pushing mechanism 76 and the fingers 84, 130 for the stabilizing hand 128 and the secondary pushing mechanism 78. Once the charge 47 is loaded onto the feeder tray, the hand 80 for the main pushing mechanism 76 pushes the charge 47 towards the loading mechanism 40 as shown in FIG. 12b. The hand 84 for the secondary pushing mechanism and the fingers 130 for the stabilizing hand 128 remain essentially tight against the leading edge of the charge 47 of items in order to prevent the endmost item from tipping. Note that the stabilizing hand 128 is moved along the feeder tray towards the loading mechanism as the endmost item in the charge 47 pushes against the fingers 130 for the stabilizing hand 128. When the fingers 84, 130 for the secondary pushing mechanism 78 and the stabilizing hand 128 reach the loading mechanism 40, the secondary pushing mechanism 78 and the stabilizing hand 128 retract such that the fingers 84, 130 will be located underneath the floor 62 of the feeder tray 34. FIG. 12c shows the fingers 84, 130 being retracted, and returning underneath the floor 62 of the feeder tray to the home position for the secondary pushing mechanism 78. Note that the stabilizing hand 128 is pushed along rail 102 by the secondary pushing mechanism 78 as it returns to its home position.

After the secondary pushing mechanism 78 and the stabilizing hand 128 return to the home position for the secondary pushing mechanism 78, the fingers 84, 130 for the secondary pushing mechanism 78 and the stabilizing hand 128 are extended vertically upward as depicted in FIG. 12d by arrow 136. The fingers 84, 130 are not raised until the hand 80 for the primary pushing mechanism 76 passes beyond the home location for the secondary pushing mechanism 78. After the fingers 84, 130 are extended, the secondary pushing mechanism 78 moves towards the loading mechanism 40, and substitutes for the main pushing mechanism 76. FIG. 12e shows the process after the hand 84 for the secondary pushing mechanism 78 has taken over the feeding of charge 47 to the loading mechanism 40. The main pushing mechanism 76 has returned to its home position along the feeder tray, and the hand 80 for the main pushing mechanism 76 and the fingers 130 for the stabilizing hand 128 are ready to accept the next charge 47b of assorted items. After the next charge of assorted items 47b has been loaded onto the feeder tray, the hand 80 for the main pushing mechanism 76 pushes the second charge 47b and the stabilizing hand 130, 128 towards the loading mechanism 40. FIG. 12f shows a point in the process in which the main pushing mechanism 76 has pushed the second charge 47b close to the remaining portion of the first charge 47a, but the fingers 84, 130 for the secondary pushing mechanism 78 and the stabilizing hand 128 still remain vertically extended above the floor 62 of the feeder tray 34. FIG. 12g shows the next step in the process in which the fingers 84, 130 for the secondary pushing mechanism 78 and the stabilizing hand 128 retract underneath the floor 62 of the feeder tray as depicted by arrow 138. As further shown in FIG. 12g, the secondary pushing mechanism 78 and the stabilizing hand 128 then return again to the home position for the secondary pushing mechanism 78. The process continues as shown and described in connection with FIGS. 12d, 12e, 12f and 12g in sequence to continue feeding assorted items to the loading mechanism 40.

As mentioned, the inductor station 18 is programmably controlled using a controller 28 which communicates with the main controller 30 for the system 10. In general, the station controller 28 controls motors and/or pneumatic cylinders or other actuators to control the operation of moving parts in the inductor station 28. The controller 28 is programmed to provide an item to the core conveyor at the appropriate time in response to information it receives from the main controller 30, as well as various sensors throughout the system.

The controller 28 controls actuators 140, 142, and 144 which position the retractable queuing plates 48, 56, 58 on the gravity feed conveyor in part in response to signals from photoelectric sensors 146, 148, 150 and manual switch 60. Sensor 150 senses whether a charge of items is being held in place on the ramp 32 by retractable queuing plate 58. Sensor 148 senses whether the second retractable queuing plate 56 is holding items in place on the ramp 32. Sensor 146 senses whether the third retractable queuing is holding items in place on the ramp 32. The controller 28 operates pneumatic cylinders 140, 142, 144 to retract or extend the respective queuing plates 48, 56, 58 in order to coordinate the queuing of charges of items from the infeed of the gravity feed conveyor 32 to the feeder tray 34. For example, if sensor 146 senses that the third queuing plate 48 is empty, and sensor 148 senses that the second queuing plate 56 is holding a charge of assorted items, the programmable controller 28 will send a control signal instructing pneumatic cylinder 142 to retract the queuing plate 56 and allow the charge to roll down the gravity feed conveyor 32 to the third queuing plate 48. When sensor 152 senses that the main pushing mechanism 76 has returned to its home position and sensors 154 and 156 sense that the stabilizing hand 128 has returned to its home position with the fingers 130 extended above the floor 62 of the feeder tray 34, the electronic controller 28 instructs pneumatic cylinder 43 to extend the longitudinal guide wall extension member 45 and instructs pneumatic cylinder 140 to retract the third queuing plate 48, thus enabling the charge held by the third queuing plate 48 to load onto the feeder tray between the hand 80 for the main pushing mechanism 76 and the fingers 130 for the stabilizing hand 128. As a worker loads items onto the infeed end of the gravity feed conveyor 32, the items are held in place by the first queuing plate 58. When the worker has filled the first queuing plate 58 with a complete charge, the worker hits manual switch 60. Once the manual switch 60 is activated, charges of assorted items are allowed to descend in a coordinated manner onto subsequent queuing plates 56, 48 and into the feeder tray 34 as long as there is space available for the charge at the next location.

FIG. 13 also shows various sensors which are useful for coordinating the movement of the feeding assembly components. For example, sensor 158 senses when the main pushing mechanism 76 has reached its end of stroke or stop location. Likewise, sensor 160 senses when the secondary pushing mechanism 78 has reached its end of stroke or the secondary stop location. Sensor 162 senses when the secondary pushing mechanism 78 has returned to its home location. Sensor 164, which has components mounted on the stabilizing hand 128 and the secondary pushing mechanism 78, senses when the stabilizing hand 128 moves or merges into close proximity with the secondary pushing mechanism 78. Sensor 164 allows the programmable controller 28 to instruct pneumatic cylinder 92 which drives the main pushing mechanism 76 to slow down as the stabilizing hand 128 approaches the secondary pushing mechanism 78. This is important for avoiding potentially disruptive collisions between the stabilizing hand 128 and the secondary pushing mechanism 78, which could otherwise occur, for example, when a subsequent charge 47b of items is moved along the feeder tray 34 towards the remaining portion of a charge 47 being loaded onto the loading mechanism 40 by the secondary pushing mechanism 78 as depicted in FIGS. 12e and 12f.

The programmable controller 28 provides instructions for operating pneumatic cylinders 100, 108, 92, and 134 to coordinate the movement of the main pushing mechanism 76, the secondary pushing mechanism 78, and the stabilizing hand 128, preferably as described in connection with FIGS. 12a–12g.

With respect to the loading mechanism 40, the programmable controller 28 instructs a motor 73 to index the stripping conveyor belt 72 forward at the appropriate time to load an item from the lift 68 onto the takeaway conveyor belt and into an assigned pocket on the core conveyor belt. Sensor 166 senses whether cleats 74 on the stripping conveyor are in the ready position prior to indexing the stripping conveyor 72. Sensor 168 senses whether an item is in place on the lifting lever 68 for the loading mechanism 40. Sensor 170 senses whether the lifting lever 68 is in the lowered position, whereas sensor 172 senses whether the lifting lever 68 is in the raised position. The programmable controller 28 instructs pneumatic cylinders 92 or 108 to push the next item in the charge onto the lifting lever 68, when the sensor 170 indicates that the lever 68 is in the lowered position and the sensor 166 senses that the cleats 74 are ready for the next item. Once the sensor 168 senses that an item has been loaded on the lifting lever 68, the programmable controller 28 instructs cylinders 92 or 108 to relieve the pressure against the charge, and then after a slight time delay instructs pneumatic cylinder 120 to raise the lifting lever 68. Once the sensor 172 senses that the lifting lever 68 has been moved into the raised position, the programmable controller instructs the motor 73 to index forward, and the cleats 74 on the stripping conveyor 72 move the item on the lift 68 to the takeaway conveyor 44.

New Embodiment

FIGS. 14 through 16 relate to a third embodiment of the invention in which the takeaway transporter is a takeaway chute 200. Also, the feeder tray 234 is inclined upward as it approaches the loading mechanism 40. In other respects, the embodiment of the invention illustrated in FIGS. 14 through 16 is generally similar to the embodiment shown in FIGS. 11 through 13, and like reference numerals are used where appropriate.

Referring to FIGS. 14 through 16, the takeaway transporter is the chute 200 which has a floor 202 that extends between the loading mechanism 40 and the core conveyor 12. Walls 204 extend perpendicularly upward from the edges of the chute floor 202 to guide items being transported from the loading mechanism 40 to the core conveyor 12. The floor 202 of the chute 200 may be slightly inclined downward as it extends from the loading mechanism 40 to the core conveyor 12, or it may also be substantially level as shown in FIG. 15 as long as the loading mechanism 40 imparts sufficient momentum when loading the items 47a. Preferably, the chute floor 202 and walls 204 made of a rigid material with a relatively low coefficient or friction.

The feeder tray 234 shown in FIGS. 14 through 16 include a floor 262 that inclines upward as it approaches the loading mechanism 40. Referring in particular to FIG. 16, the purpose of the incline of the floor 262 is to begin the separation process between adjacent items in the charge or loaf 47 being fed to the loading mechanism 40. In other words, as an item is advanced within the loaf towards the loading mechanism 40, the item 47 moves vertically upward relative to the subsequent item in the loaf, shown at 47b. The vertical relative movement between items 47, 47b helps to loosen the contact between the adjacent items, thereby lessening the chance of the items sticking together when loaded on to the takeaway chute 200 by the loading mechanism 40.

It should be apparent to those skilled in the art that the invention provides particularly reliable and efficient means for continuously loading assorted items onto a sortation conveying system. While the invention has been described herein in connection with several embodiments, the invention should not be necessarily limited to the details described herein. In determining the scope of the invention, reference shall be made to the following claims which particularly point out and distinctly claim the invention.

We claim:

1. A loading mechanism that repeatably loads a single item stripped from an end of a charge of assorted items onto a takeaway transporter, the loading mechanism comprising:

a lift located upstream of an infeed location for a takeaway transporter;

a substantially vertical guide plate located adjacent the lift and in line with the takeaway transporter; and a vertical stripping conveyor located adjacent the substantially vertical guide plate on a side of the substantially vertical guide plate opposite the lift, the stripping conveyor having a plurality of cleats extending from the stripping conveyor beyond the substantially vertical guide plate in the direction of the lift;

wherein the lift lifts an endmost item from an end of a charge of assorted items and the cleats on the stripping conveyor pushes the lifted item in a direction substantially perpendicular from the charge of assorted items on edge onto the takeaway transporter.

2. A loading mechanism as recited in claim 1 further comprising:

a holdback member located between the lift and the takeaway transporter, the holdback member defining a horizontal obstacle for items located in front of the infeed of the takeaway transporter, the height of the horizontal obstacle being no greater than a loading height for the takeaway conveyor belt;

wherein the charge of assorted items are fed to the loading mechanism such that at least a portion of the lower edge of the assorted items are positioned lower than the loading height of the takeaway conveyor belt and the lift raises the respective item from the end of the charge so that the lower edge of the item is raised at least as high as the loading height for the takeaway conveyor belt when the stripping conveyor pushes the item onto the takeaway conveyor belt.

3. A loading mechanism as recited in claim 1 wherein the lift comprises:

a lever pivotally mounted for rotation between a lowered position and raised position, the lever having a top surface that receives items loaded onto the lift; and an actuator arm connected to the lever for moving the lever between the lowered position and the raised position.

4. The loading mechanism as recited in claim 3 wherein the top surface of the lever is essentially parallel with the takeaway transporter when the lever is positioned in the raised position, and is angled downward relative to the takeaway transporter when the lever is in the lowered position.

5. The loading mechanism of claim 3 wherein the width of the lever is less than the width of assorted items fed to the lift.

6. The loading mechanism as recited in claim 3 further comprising a sensor that monitors when the lever is in the raised position and another sensor that monitors when the lever is in the lowered position.

7. The loading mechanism as recited in claim 1 wherein the lever has a side surface that moves in a plane parallel to the vertical guide plate and is immediately adjacent to the vertical guide plate.

8. A loading mechanism as recited in claim 1 wherein the stripping conveyor is an indexing motion stripping conveyor that is electronically controlled.

9. A loading mechanism as recited in claim 1 wherein the stripping conveyor comprises cleats located above the vertical guide plate as well as below the vertical guide plate.

10. The loading mechanism as recited in claim 9 further comprising an additional vertical guide plate located below the path of the lower cleats.

11. The loading mechanism as recited in claim 1 wherein the takeaway transporter is a takeaway conveyor belt.

12. The loading mechanism as recited in claim 1 wherein the takeaway transporter is a transport chute.

* * * * *